(12) United States Patent
Rook et al.

(10) Patent No.: US 10,504,066 B2
(45) Date of Patent: Dec. 10, 2019

(54) AUTOMATIC DISCOVERY OF ALTERNATE MAILBOXES

(75) Inventors: Harvey Rook, Newcastle, WA (US);
Ashish Consul, Redmond, WA (US);
Karim Batthish, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 469 days.

(21) Appl. No.: 12/328,355

(22) Filed: Dec. 4, 2008

(65) Prior Publication Data

US 2010/0145932 A1 Jun. 10, 2010

(51) Int. Cl.
*G06F 7/00* (2006.01)
*G06Q 10/10* (2012.01)
*H04L 12/58* (2006.01)
*G06F 17/27* (2006.01)

(52) U.S. Cl.
CPC .......... *G06Q 10/107* (2013.01); *H04L 51/22* (2013.01); *G06F 17/278* (2013.01); *H04L 51/30* (2013.01)

(58) Field of Classification Search
CPC .................................................. G06F 17/278
USPC .. 707/836, 788, 772, 999.102, 999.104, 609
See application file for complete search history.

(56) References Cited

U.S. PATENT DOCUMENTS

| | | | |
|---|---|---|---|
| 6,336,138 B1 | 1/2002 | Caswell | |
| 6,643,685 B1 * | 11/2003 | Millard | H04L 29/12009 709/206 |
| 6,721,785 B1 * | 4/2004 | Raghunandan | H04L 51/28 709/204 |
| 6,799,148 B2 * | 9/2004 | Ling | G06Q 10/107 379/100.08 |
| 6,993,561 B2 * | 1/2006 | Lincke | G06Q 10/107 709/206 |

(Continued)

FOREIGN PATENT DOCUMENTS

CN 101022428 A 8/2007
JP 2001-274841 A 10/2001
(Continued)

OTHER PUBLICATIONS

Australian Notice of Acceptance in Application 2009322639, dated May 2, 2014, 2 pgs.

(Continued)

*Primary Examiner* — Eliyah S. Harper
(74) *Attorney, Agent, or Firm* — Merchant & Gould P.C.

(57) ABSTRACT

As described herein, a client system is automatically configured to access message objects in a plurality of mailboxes stored at a server system. The client system sends an autodiscover request to the server system. In response, the server system sends to the client system an autodiscover response that contains an autodiscover response document that comprises a primary mailbox element and at least one alternate mailbox element. The client system uses a first set of mailbox identification data specified by the primary mailbox element to access message objects in a primary mailbox stored at the server system and uses sets of mailbox identification data specified by the alternate mailbox elements to access message objects in alternate mailboxes stored at the server system. Email messages are one example type of message objects. The alternate mailbox may be an archive mailbox used to store message objects for occasional reference.

20 Claims, 5 Drawing Sheets

(56) References Cited

U.S. PATENT DOCUMENTS

| | | | |
|---|---|---|---|
| 7,353,257 B2 | 4/2008 | Pettigrew | |
| 7,577,704 B1* | 8/2009 | Hegde | G06Q 10/10 |
| | | | 709/205 |
| 7,617,284 B2* | 11/2009 | Salamuniccar | H04L 51/28 |
| | | | 379/93.01 |
| 7,703,023 B2* | 4/2010 | O'Mahony | H04L 63/0815 |
| | | | 715/706 |
| 7,818,384 B2* | 10/2010 | Rachal | G06Q 10/107 |
| | | | 709/206 |
| 7,836,137 B2* | 11/2010 | Jalobeanu | G06Q 10/107 |
| | | | 707/708 |
| 7,941,415 B2* | 5/2011 | Gile | G06F 17/278 |
| | | | 707/705 |
| 8,375,307 B2* | 2/2013 | Kim | G06Q 10/107 |
| | | | 709/206 |
| 9,374,435 B2* | 6/2016 | Lazaridis | H04L 67/2814 |
| 2002/0120748 A1 | 8/2002 | Schiavone | |
| 2002/0165699 A1 | 11/2002 | Ling et al. | |
| 2003/0233353 A1* | 12/2003 | Taylor | H04L 29/12132 |
| 2004/0236837 A1* | 11/2004 | Sherwood | H04L 51/14 |
| | | | 709/207 |
| 2005/0033830 A1 | 2/2005 | Gorty | |
| 2005/0047570 A1* | 3/2005 | Schmid | H04L 63/1408 |
| | | | 379/189 |
| 2005/0204011 A1* | 9/2005 | Velayudham | H04L 29/1215 |
| | | | 709/206 |
| 2005/0267938 A1* | 12/2005 | Czeczulin | G06Q 10/107 |
| | | | 709/206 |
| 2006/0200524 A1 | 9/2006 | Costenaro | |
| 2007/0106733 A1 | 5/2007 | Ramanathan | |
| 2007/0121885 A1 | 5/2007 | Sin | |
| 2008/0065470 A1* | 3/2008 | Nelmes | G06Q 10/06 |
| | | | 705/7.36 |
| 2008/0091765 A1* | 4/2008 | Gammage | G06T 7/40 |
| | | | 709/202 |
| 2008/0177845 A1 | 7/2008 | Bracewell et al. | |
| 2008/0263156 A1* | 10/2008 | Costea | H04L 51/12 |
| | | | 709/206 |
| 2008/0276179 A1* | 11/2008 | Borenstein | G06Q 10/10 |
| | | | 715/736 |
| 2008/0281781 A1* | 11/2008 | Zhao | G06F 17/30722 |
| 2008/0294728 A1 | 11/2008 | Batthish et al. | |
| 2009/0016524 A1* | 1/2009 | Park | H04W 8/26 |
| | | | 380/44 |

FOREIGN PATENT DOCUMENTS

| | | | |
|---|---|---|---|
| JP | 2002-366399 A | 12/2002 | |
| JP | 2004-005360 A | 1/2004 | |
| KR | 1020070085245 | 8/2007 | |
| RU | 47543 U1 | 8/2005 | |

OTHER PUBLICATIONS

Japanese Notice of Allowance in Application 2011-539614, dated May 2, 2014, 4 pgs.
Mexican Office Action for Patent Application MX/a/2011/05929, dated May 29, 2013, 5 pages (with English summary).
Russian Notice of Allowance in Application 2011122595, dated Jul. 30, 2014, 22 pgs.
Russian Office Action in Application 2011122595, dated Nov. 6, 2013, 6 pgs. (w/o English Translation).
Australian Office Action in Application 2009322639, dated Mar. 17, 2014, 3 pgs.
Chinese Final Decision on Rejection in Application 200980148991.5, dated Feb. 26, 2014, 11 pgs.
European Official Communication in Application 09830927.1, dated Jan. 3, 2014, 1 pg.
Israel Official Communication in Application 212299, dated Mar. 26, 2014, 3 pgs.
Availability Service FAQs, 1. Understanding Availability Service and Auto-Discover, Jun. 16, 2007, 11 pages.
Configuring Outlook Anywhere Overview, Issue date Aug. 23, 2007, Copyright 1996-2008, Slipstick Systems and CDOLive LLC, 4 pages.
Exchange 2007 Autodiscover Service Part 1, Exchange_Genie, Jul. 6, 2007, 19 pages.
Exchange Mailbox Archiver Agent, accessed Sep. 26, 2008, pp. 1-89, at http://documentation.commvault.com/dell/release_7_0_0/books_online_1/english_us/prod_info/pdf/dm_ex.pdf.
Outlook Automatic Account Configuration, 22 pages, accessed Sep. 25, 2008 at http://office.microsoft.com/download/afile.aspx?AssetID=AM102105061033.
Israel Office Action in Application 212299, dated Dec. 14, 2014, 3 pgs. (partially in English).
Chinese 1st Office Action in Application 200980148991.5, dated Aug. 8, 2012, 8 pgs.
Chinese 2nd Office Action in Application 200980148991.5, dated Apr. 2, 2013, 12 pgs.
Chinese 3rd Office Action in Application 200980148991.5, dated Aug. 20, 2013, 11 pgs.
Extended European Search Report in Application 09830927.1, dated Dec. 5, 2013, 5 pgs.
Japanese Notice of Rejection in Application 2011-539614, dated Dec. 6, 2013, 6 pgs.
Masahide Ise, "'Integrated E-mail Management'" is Corporate Common Practice, Computerworld, Get Technology Right, Japan, KK IDG Japan, Jul. 1, 2006, vol. 3, Issue 7, pp. 84 to 89.
Takayuki Sekiya, "Development and Evaluation of Education Campuswide Computing System Consisting of NetBoot Clients," Journal from Information Processing Society of Japan, Japan, Information Processing Society of Japan, Apr. 15, 2007, vol. 48, Issue 4, pp. 1651 to 1664.
"Office Action Issued in Israel Patent Application No. 212299", dated Aug. 16, 2015, 1 page. (W/o English Translation).
Chinese Notice on Re-Examination in Application 200980148991.5, dated Jul. 28, 2015, 16 pgs.
"First Office Action and Search Report Issued in Chinese Patent Application No. 201610117822.7", dated Feb. 3, 2019, 23 Pages.
"Summons to Attend Oral Proceedings Issued in European Patent Application No. 09830927.1", dated Sep. 19, 2018, 6 Pages.
"Office Action Issued in Indian Patent Application No. 3992/CHENP/2011", dated Sep. 26, 2018, 5 Pages.
"Office Action Issued in European Patent Application No. 09830927.1", dated Oct. 25, 2017, 7 Pages.
Korean Office Action in Application 10-2011-7012649, dated Apr. 11, 2016, 15 pgs.
Malaysian Adverse Report in Application PI 2011001999, dated Mar. 15, 2016, 3 pgs.
International Search Report and Written Opinion in PCT/US2009/066113 dated Jun. 23, 2010, 12 pages.
Canadian Office Action in Application 2742124, dated Nov. 6, 2015, 5 pgs.
Chinese Decision on Re-Examination in Application 200980148991.5, dated Nov. 30, 2015, 25 pgs.
"Office Action Issued in Brazilian Patent Application No. PI0921809-2", dated Jul. 5, 2019, 5 Pages.

* cited by examiner

AUTOMATIC DISCOVERY OF ALTERNATE MAILBOXES

BACKGROUND

In today's economy, people exchange dozens of email messages everyday. Some of the email messages a person receives may contain important information. Other ones of the email messages a person receives may not seem important when they are received, but are later discovered to be useful. For this reason, people tend to retain email messages, even email messages of questionable importance, for long periods of time.

Retention of such email messages may cause problems for institutions providing email messaging services. For instance, institutions may have to purchase large and expensive data storage systems to store old email messages. In other instances, institutions may configure users' computers to store the users' old email messages. Storing email messages on users' computers may increase retrieval costs during e-discovery. Configuring such email message storage solutions is typically difficult and requires manual configuration of users' computers.

SUMMARY

This disclosure is directed to automatically configuring a client system to access message objects in a plurality of mailboxes stored at a server system. As described herein, the client system sends an autodiscover request to the server system. In response, the server system sends to the client system an autodiscover response that contains an autodiscover response document that comprises a primary mailbox element and at least one alternate mailbox element. The client system uses a first set of mailbox identification data specified by the primary mailbox element to access message objects in a primary mailbox stored at the server system and uses sets of mailbox identification data specified by the alternate mailbox elements to access message objects in alternate mailboxes stored at the server system. Email messages are one example type of message objects. The alternate mailbox may be an archive mailbox that stores message objects that are used for occasional reference.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

DETAILED DESCRIPTION

As briefly described above, the present disclosure is directed to automatically configuring a client device to access message objects in a plurality of mailboxes stored at a server system. This disclosure discusses a set of figures. These figures are provided for purposes of explanation only and are not intended to represent a sole way of implementing these technologies. In other words, the figures illustrate mere examples.

Figure 1:
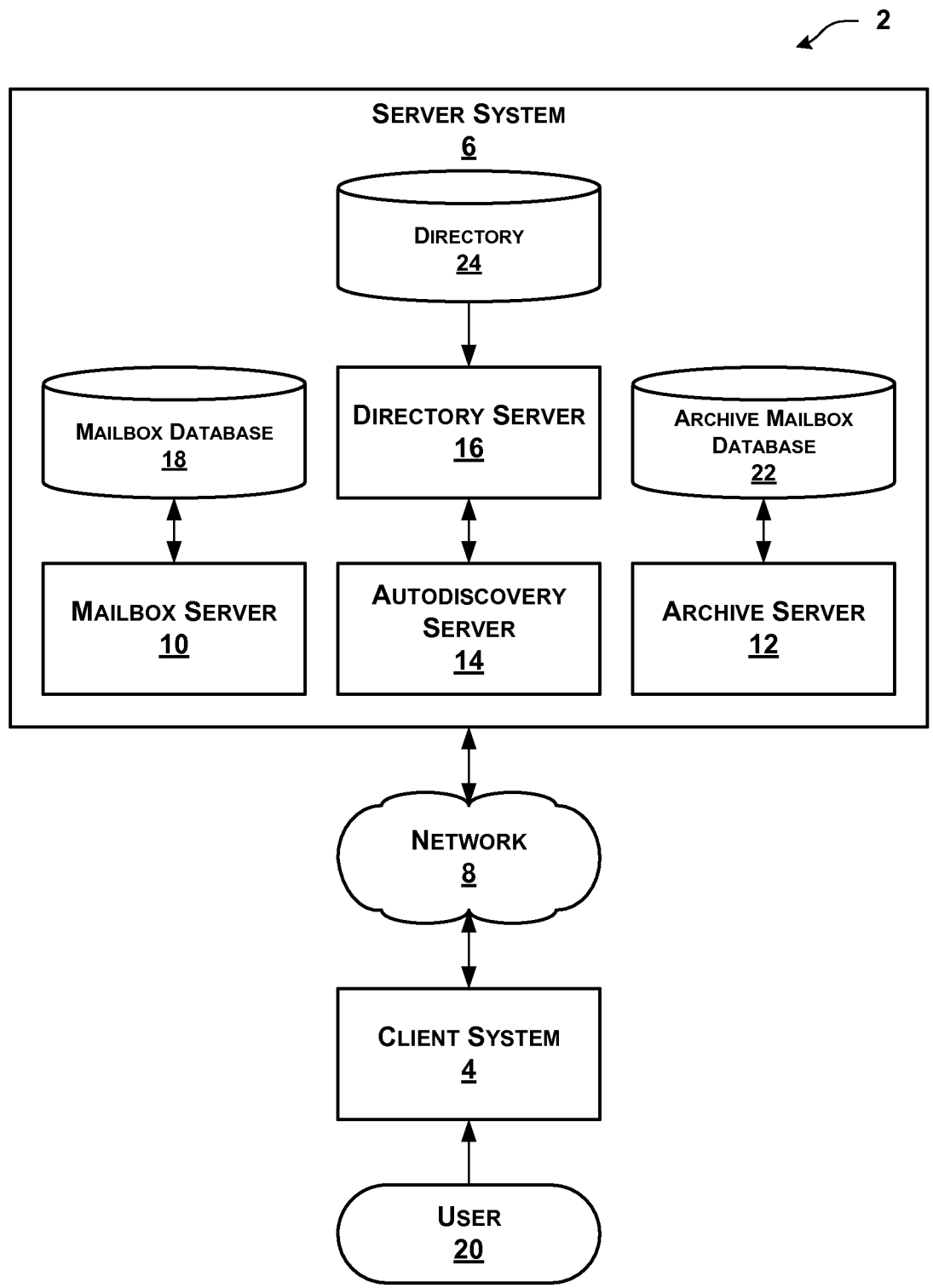
FIG. 1 is a block diagram that illustrates an example system in which a client system is automatically configured to access message objects in a plurality of mailboxes stored at a server system.

FIG. 1 is a block diagram that illustrates an example messaging system 2 in which a client system is automatically configured to access message objects in a plurality of mailboxes stored at a server system. As illustrated in the example of FIG. 1, messaging system 2 comprises a client system 4. As used throughout this disclosure, a "client system" is a set of one or more physical electronic computing devices configured to utilize a network service. For example, client system 4 may be a set of one or more personal computers, laptop computers, mobile telephones, television set-top boxes, mainframe computers, standalone server devices, blade server devices, devices integrated into vehicles, handheld computing devices, personal digital assistants, media player devices, and other types of physical computing devices configured to utilize a network service. An example electronic computing device is described below with reference to FIG. 5. Although not illustrated in the example of FIG. 1 for sake of simplicity, message system 2 may comprise many client systems like client system 4.

Furthermore, messaging system 2 comprises a server system 6 that provides messaging services. As used throughout this disclosure, a "server system" is a set of one or more physical electronic computing devices that provide a network service. For example, server system 6 may be a set of one or more standalone server devices, blade server devices, mainframe computers, network data centers, intermediate network devices, personal computers, and/or other types of physical electronic computing devices configured to provide a network service.

As illustrated in the example of FIG. 1, messaging system 2 includes a network 8. Network 8 is an electronic communications network that facilitates electronic communication between client system 4 and server system 6. For example, network 8 may be a wide-area network, such as the Internet, a local-area network, a metropolitan-area network, or another type of electronic communication network. Network 8 may include wired and/or wireless data links. A variety of communications protocols may be used in network 8 including, but not limited to, Ethernet, Transport Control Protocol (TCP), Internet Protocol (IP), Hypertext Transfer Protocol (HTTP), SOAP, remote procedure call protocols, and/or other types of communications protocols.

In the example of FIG. 1, server system 6 is shown as comprising a mailbox server 10 that provides a mailbox access service, an archive server 12 that provides an archive mailbox access service, an autodiscover server 14 that provides an autodiscover service, and a directory server 16 that provides a directory access service. In addition, server system 6 comprises a mailbox database 18, an archive mailbox database 22, and a directory 24. Mailbox server 10, archive server 12, autodiscover server 14, and directory server 16 are servers. As used in this disclosure, a "server" is something that provides a service. For instance, a software application that provides a service is a server. In this instance, multiple servers may operate on a single physical electronic computing device. In another instance, an application-specific integrated circuit (ASIC) that provides a service is a server.

It will be appreciated that in various implementations of messaging system 2, one or more of mailbox server 10, archive server 12, autodiscover server 14, and directory server 16 may be implemented as instructions of software applications operating on one or more electronic computing devices. In a first example, mailbox server 10 and autodiscover server 14 may be implemented as software applications operating on a first electronic computing device and archive server 12 and directory server 16 may be implemented as software applications operating on a second electronic computing device. In a second example, a single electronic computing device may act as mailbox server 10, archive server 12, autodiscover server 14, and directory server 16. In a third example implementation, two separate electronic computing devices may provide the functionality of mailbox server 10. In such implementations, the instructions of the software applications, along with mailbox database 18, may be stored on a computer-readable data storage system. As used in this disclosure, a computer-readable data storage system is a collection of one or more computer-readable data storage media.

Mailbox server 10 provides a mailbox access service that enables clients to access message objects stored in mailbox database 18. As used in this disclosure, a "mailbox" is a logical collection of messaging objects that is associated with a user. A "messaging object" is either a folder or a message object. A "folder" in a mailbox contains a subset of the messaging objects in the mailbox. A "message object" is a collection of properties of a message that provides information to a user. Messages may come in a variety of forms. For example, the messages in a mailbox may be email messages. In a second example, the messages in a mailbox may be calendar messages. Other examples messages include tasks, journal entries, contacts, and so on. The mailboxes stored at mailbox database 18 are peers of one another. As used in this disclosure, a first mailbox is a "peer" of a second mailbox when there does not exist any messaging object in the first mailbox that is also in the second mailbox. In other words, there is no hierarchical relationship between the two mailboxes. Although not illustrated in the example of FIG. 1 for the sake of simplicity, mailbox server 10 may be one of several mailbox servers operating at server system 6. Furthermore, although not illustrated in the example of FIG. 1 for the sake of simplicity, mailbox server 10 may provide access to message objects stored in mailbox databases other than mailbox database 18 and other mailbox servers may provide access to message objects in mailbox database 18 and mailbox databases other than mailbox database 18. For instance, mailbox server 10 may provide access to message objects in archive mailbox database 22.

Archive server 12 provides a mailbox access service that provides access to message objects in a set of archive mailboxes in archive mailbox database 22. As used in this disclosure, an "archive mailbox" is a mailbox containing archived messages. An "archived message" is a message retained for occasional reference purposes instead of daily use. Message objects in an archive mailbox are not cached locally at client system 4. The archive mailboxes stored at archive mailbox database 22 are peers of one another and are peers of the mailboxes stored at mailbox server 10. Although not illustrated in the example of FIG. 1 for the sake of simplicity, archive server 12 may be one of several archive servers operating at server system 6. Furthermore, although not illustrated in the example of FIG. 1 for the sake of simplicity, archive server 12 may provide access to message objects stored in archive mailbox databases other than archive mailbox database 22 and other archive mailbox servers may provide access to message objects in archive mailbox database 22 and archive mailbox databases other than archive mailbox database 22. Although archive server 12 is illustrated as a separate server in the example of FIG. 1, mailbox server 10 may, in some example implementations, provide access to archive mailboxes in archive mailbox database 22. Furthermore, in some example implementations, mailbox database 18 and/or archive mailbox database 22 may store archive mailboxes along with non-archive mailboxes. In such implementations, mailbox server 10 and/or archive server 12 may provide access to both the archive mailboxes and the non-archive mailboxes in mailbox database 18 and/or archive mailbox database 22.

Each user of server system 6 is associated with a mail account. Directory server 16 provides a directory service that provides access to directory 24. Directory 24 contains remote user profiles of registered users of messaging system 2. A remote user profile is a set of data that specifies properties of a mail account of a user. The properties specified in a remote user profile include a set of mailboxes with which the user is associated and other information about the user. In general, an administrator of server system 6 creates and edits the remote user profiles in directory 24. Directory server 16 may be implemented in a variety of ways. For example, directory server 16 may provide an ACTIVE DIRECTORY® directory service. In this example, directory requests and directory responses may be formatted using the Lightweight Directory Access Protocol (LDAP). Although not illustrated in the example of FIG. 1 for the sake of simplicity, directory server 16 may be one of several directory servers operating at server system 6.

Autodiscover server 14 provides an autodiscover service that client system 4 uses to automatically configure itself to access message objects in a subset of the mailboxes accessible through at mailbox server 10 and/or archive server 12. Client system 4 may need to configure itself to access message objects in a subset of the mailboxes because mailbox server 10 and archive server 12 may store many mailboxes that are not associated with a user 20 of client system 4 and client system 4 should only be able to access message objects in the subset of mailboxes stored by mailbox server 10 and archive server 12 that are associated with user 20.

To use the autodiscover service provided by autodiscover server 14, client system 4 sends via network 8 an autodiscover request to autodiscover server 14. The autodiscover request is a request to use the autodiscover service provided by autodiscover server 14.

As described below with reference to FIG. 2, when autodiscover server 14 receives the autodiscover request, autodiscover server 14 uses a profile of user 20 stored at directory server 16 to generate an autodiscover response document. The autodiscover response document specifies how client system 4 should configure itself to access message objects in a subset of the message mailboxes accessible through at mailbox server 10 and/or archive server 12.

Information within the autodiscover response document conforms to a schema. As used in this disclosure, a "schema" is a formal description of a type of document. For example, the information within the autodiscover response document may be extensible markup language (XML) data that conforms to an XML schema. In other examples, the information in the autodiscover response document may be formatted in other ways including, but not limited the Standard Generalized Markup Language (SGML), comma separated value (CSV) format, LaTeX, and other formats. Because the information within the autodiscover response document conforms to a schema, the information within the autodiscover response document can be readily parsed by an electronic computing system having access to the schema.

The autodiscover response document specifies a primary mailbox element that contains a first set of mailbox identification data. The first set of mailbox identification data identifies to server system 6 a primary mailbox associated with user 20. In addition, the autodiscover response document specifies at least one alternate mailbox element that contains a second set of mailbox identification data. The second set of mailbox identification data identifies to server system 6 an alternate mailbox associated with user 20. For example, the second set of mailbox identification data may identify an archive mailbox associated with user 20.

After generating the autodiscover response document, autodiscover server 14 sends to client system 4 via network 8 an autodiscover response that is responsive to the autodiscover request. The autodiscover response contains the autodiscover response document. Upon receiving the autodiscover response, client system 4 updates the local profile of user 20 at client system 4 to contain the first set of mailbox identification data and the second set of mailbox identification data.

In the example implementation of FIG. 1, client system 4 uses the first set of mailbox identification data to establish a connection to a mailbox access service provided by server system 6 and uses the second set of mailbox identification data to establish a connection to a mailbox access service provided by server system 6. For example, client system 4 may use the first set of mailbox identification data to establish a first connection to the mailbox access service provided by mailbox server 10 and uses the second set of mailbox identification data to establish a second connection to the mailbox access service provided by mailbox server 10. In another example, if the second set of mailbox identification data so indicates, client system 4 uses the second set of mailbox identification data to establish a second connection to the mailbox access service provided by archive server 12. Client system 4 may use the first connection to access message objects in the primary mailbox and uses the second connection to access message objects in the alternate mailbox.

Client system 4 may utilize a variety of techniques to access message objects using the mailbox access service. For example, mailbox server 10 and archive server 12 may be implemented as remote procedure call (RPC) endpoints. In this example, client system 4 may use the mailbox access service provided by mailbox server 10 by sending remote procedure call messages to mailbox server 10 and may use the archive mailbox access service provided by archive server 12 by sending remote procedure call messages to archive server 12. In this example, client system 4 may receive message objects as responses to the remote procedure call requests.

In this way, by using the autodiscover service provided by autodiscover server 14, client system 4 is able to automatically configure itself to access message objects in the primary mailbox and message objects in an alternate mailbox or alternate mailboxes. Furthermore, because client system 4 automatically acquires the autodiscover response document, an administrator of server system 6 may be able to configure which mailboxes user 20 has access to without manually configuring client system 4.

Figure 2:
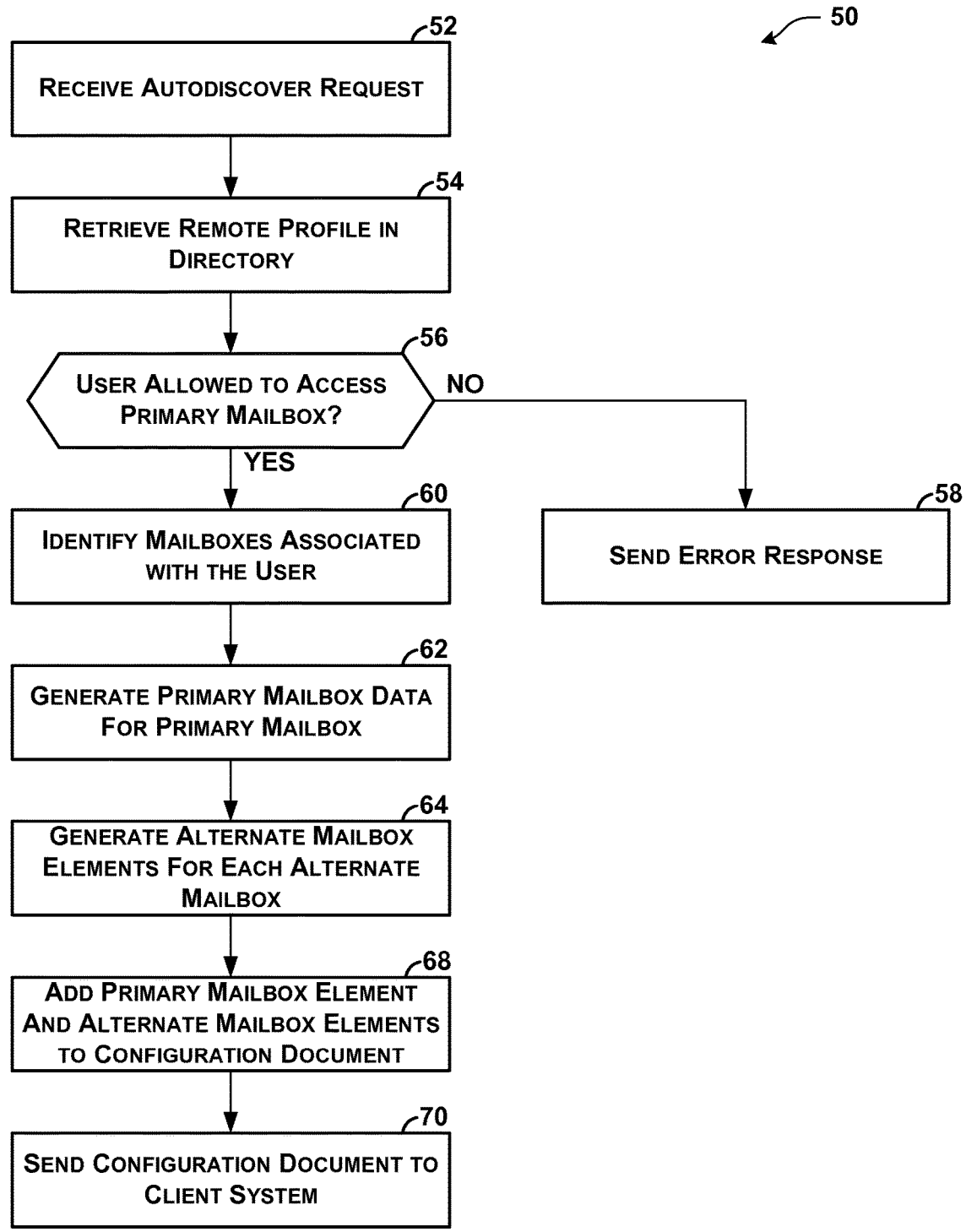
FIG. 2 is a flowchart illustrating an example operation performed by an autodiscover server operating at the server system.

FIG. 2 is a flowchart that illustrates an example operation 50 of autodiscover server 14. As illustrated in the example of FIG. 2, operation 50 of autodiscover server 14 receives an autodiscover request from client system 4 via network 8 (52). The autodiscover request contains information that identifies a primary mailbox of user 20. For instance, in one example implementation, the autodiscover request specifies an email address associated with a primary mailbox of user 20. In another example implementation, the autodiscover request specifies a distinguished name of a primary mailbox of user 20. Furthermore, in one example implementation, the autodiscover request may specify an acceptable response schema. In this example implementation, the autodiscover response document in an autodiscover response that is responsive to the autodiscover request conforms to the acceptable response schema specified by the autodiscover request.

After receiving the autodiscover request, autodiscover server 14 retrieves a remote profile of user 20 from directory server 16 (54). In one example implementation, autodiscover server 14 may use an email address specified by the autodiscover request or a legacy distinguished name specified by the autodiscover request to retrieve the remote profile of user 20 from directory server 16.

Next, autodiscover server 14 uses the remote profile of user 20 to determine whether user 20 is allowed to access the primary mailbox specified in the autodiscover request (56). For example, autodiscover server 14 may compare a username and password provided by user 20 with a username and password specified in the remote profile of user 20. If user 20 is not allowed to access the primary mailbox specified in the autodiscover request ("NO" of 56), autodiscover server 14 sends an error response to client system 4 (58). The error response may be a terminal error message, may prompt user 20 to input new user identification credentials, or may be another type of error response. In this way, autodiscover server 14 effectively prevents client system 4 from configuring itself to access the primary mailbox specified in the autodiscover request and any alternate mailboxes when user 20 is not allowed to access the primary mailbox specified in the autodiscover request.

On the other hand, if user 20 is allowed to access the primary mailbox specified in the autodiscover request ("YES" of 56), autodiscover server 14 uses the remote profile of user 20 to identify mailboxes associated with user 20 (60). In this way, if user 20 is allowed to access the primary mailbox specified in the autodiscover request, that is a sufficient condition for user 20 to access the alternate mailboxes (including one or more archive mailboxes) specified in the remote profile.

Next, autodiscover server 14 generates a first set of mailbox identification data that identifies to server system 6 the primary mailbox specified in the autodiscover request (62). Autodiscover server 14 may use information in the remote profile of user 20 to generate the first set of mailbox identification data. In one example implementation, the first set of mailbox identification data may be formatted as a collection of XML elements. In this example implementation, the XML elements include a <User> element that provides user-specific information. The <User> element includes a <LegacyDN> element that specifies a legacy distinguished name of the primary mailbox. In addition, the <User> element includes a <DisplayName> element that specifies a displayable name of a user associated with the primary mailbox. The <User> element may appear in an autodiscover response document as:

```
<User>
    <DisplayName>Karim Batthish</DisplayName>
    <LegacyDN>/o=contoso/ou=First Administrative
Group/cn=Recipients/cn=karimb</LegacyDN>
</User>
```

In addition, the collection of XML elements that define the first set of mailbox identification data may include a <Protocol> element. The <Protocol> element contains specifications for connecting client system 4 to a mailbox server (e.g., mailbox server 10). In one example implementation, the <Protocol> element contains at least the following elements: a <Type> element, a <Server> element, a <ServerDN> element, a <MdbDN> element, and a <ServerVersion> element. The <Type> element specifies a type of a mail account. The <Server> element specifies a resource identifier of a mailbox server. The resource identifier of the <Server> element may be a host name, an Internet Protocol address, or another type of resource identifier. The <ServerDN> element specifies a distinguished name of an electronic computing device that is running the mailbox server. The <MdbDN> element specifies a legacy distinguished name of a mailbox database. The <ServerVersion> element specifies a version of the mailbox server software. The mailbox server software is software that, when executed at server system 6, causes server system 6 to provide a mailbox server. Assembled, a <Protocol> element may appear in an autodiscover response document as:

```
<Protocol>
    <Type>EXCH</Type>
    <Server>DF-MBX-62.exchange.corp.contoso.com</Server>
    <ServerDN>/o=contoso/ou= Administrative Group
(FYDIBOHF23SPDLT)/cn=Configuration/cn=Servers/
cn=DF-MBX-62</ServerDN>
    <ServerVersion>73808133</ServerVersion>
    <MdbDN>/o=microsoft/ou=Administrative Group
(FYDIBOHF23SPDLT)/cn=Configuration/cn=Servers/cn=DF-MBX-62/
cn=Contoso Private MDB</MdbDN>
</Protocol>
```

Next, autodiscover server 14 generates an alternate mailbox element for each alternate mailbox associated with user 20 (64). Each alternate mailbox element contains a set of mailbox identification data that identifies to server system 6 an alternate mailbox associated with user 20. Autodiscover server 14 may use the remote profile of user 20 to generate each set of mailbox identification data.

In one example implementation, an alternate mailbox element comprises at least the following XML elements: a <Type> element, an <ID> element, a <DisplayName> element, a <LegacyDN> element, a <Server> element, a <ServerDN> element, a <MdbDN> element, and a <ServerVersion> element.

In this example implementation, the <Type> element specifies a type of an alternate mailbox. The type of an alternate mailbox specifies a behavior of the mailbox. For example, a <Type> element may specify that an alternate mailbox is a mailbox-type mailbox, an archive mailbox, a subscription mailbox, or another type of mailbox. The <ID> element specifies a unique identifier associated with a mail account of a user. The <DisplayName> element specifies a name that client system 4 may display in association with the alternate mailbox. The <LegacyDN> element specifies a legacy distinguished name of the alternate mailbox. The <Server> element specifies a fully-qualified domain name of a mailbox server that provides access to the alternate mailbox. The <Server> element occurs exactly once within an alternate mailbox element. The <ServerDN> element specifies a computing device that is running a mailbox server that provides access to the alternate mailbox. The <ServerDN> element differs from the <Server> element in that the <ServerDN> element specifies a distinguished name and the <Server> element specifies a fully-qualified domain name. Furthermore, the <ServerDN> element differs from the <Server> element in that the <ServerDN> element specifies a computing device that runs the mailbox server and the <Server> element specifies the mailbox server. The distinction may be significant when a computing device runs multiple mailbox servers. The <MdbDN> element specifies a distinguished name of a mailbox database that stores the alternate mailbox database. The <ServerVersion> element specifies a version number of the mailbox server software operating at server system 6.

The following is an example <AlternativeMailbox> element that may appear in an autodiscover response document:

```
<AlternativeMailbox>
    <ID>{GUID1}</ID>
    <Type>Mailbox</Type>
    <DisplayName>Mailbox - Karim Batthish</DisplayName>
    <Server>DF-MBX-62.exchange.corp.contoso.com</Server>
    <ServerDN>/o=contoso/ou=Administrative Group
(FYDIBOHF23SPDLT)/cn=Configuration/cn=Servers/
cn=DF-MBX-62</ServerDN>
    <ServerVersion>73808133</ServerVersion>
    <MdbDN>/o=contoso/ou=Administrative Group
(FYDIBOHF23SPDLT)/cn=Configuration/cn=Servers/cn=DF-MBX-62/
cn=Contoso Private MDB3</MdbDN>
    <LegacyDN>/o=contoso/ou=First Administrative Group/
cn=Recipients/cn=karimb/archive=AltMailboxGUID3</LegacyDN>
</AlternativeMailbox>
```

After autodiscover server 14 generates the alternate mailbox elements for each alternate mailbox, autodiscover server 14 adds the alternate mailbox elements and the one or more elements representing the first set of mailbox identification data to an autodiscover response document (68). Autodiscover server 14 then sends the autodiscover response document to client system 4 via network 8 (70).

Figure 3:
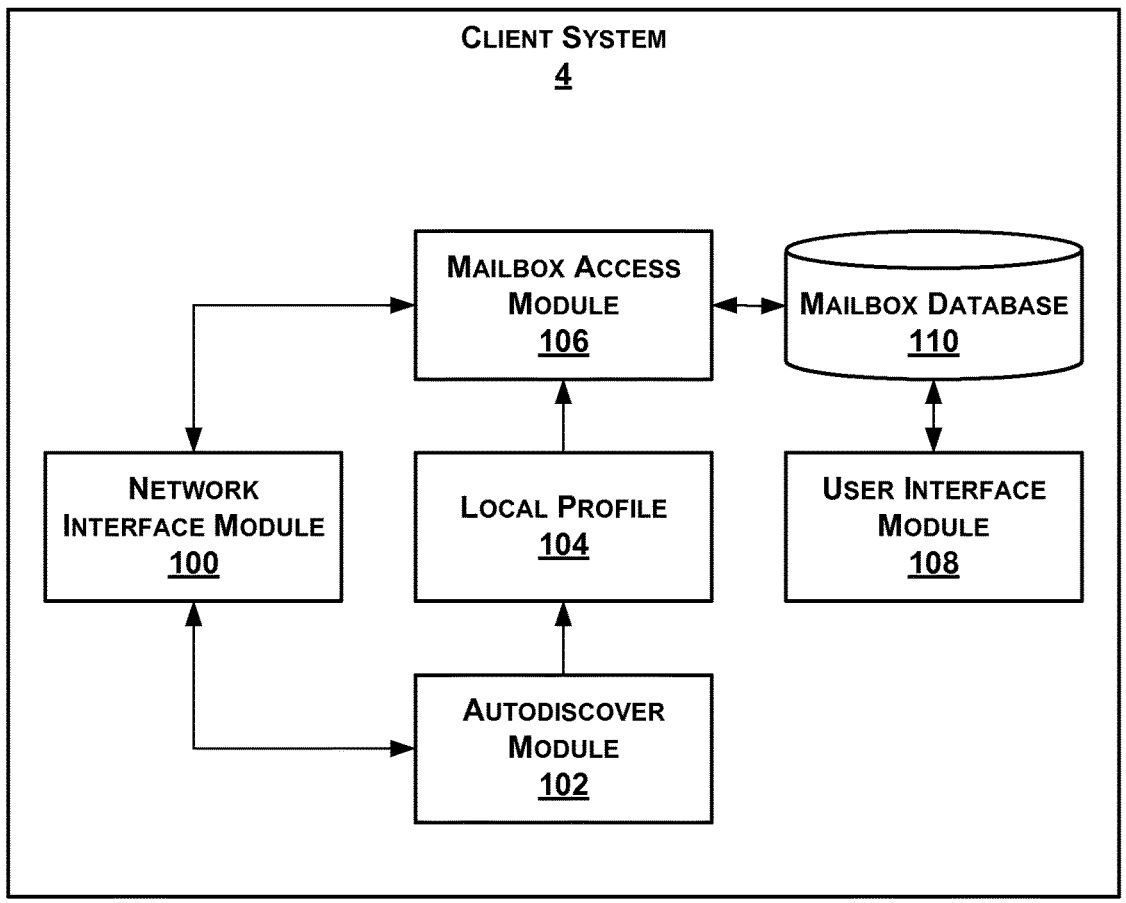
FIG. 3 is a block diagram illustrating example logical components of the client system.

FIG. 3 is a block diagram illustrating example logical details of client system 4. As illustrated in the example of FIG. 3, client system 4 comprises a network interface module 100, an autodiscover module 102, a local profile 104, a mailbox access module 106, and a user interface module 108. Network interface module 100 enables client system 4 to communicate on network 8. Autodiscover module 102 automatically causes client system 4 to use the autodiscover service provided by server system 6 to update local profile 104 to store mailbox identification data that identifies mailboxes associated with user 20. Local profile 104 is a set of information stored at client system 4 that is specific to user 20. Mailbox access module 106 causes client system 4 to use the mailbox identification data in local profile 104 to access messaging objects in the mailboxes associated with user 20. User interface module 108 causes client system 4 to present a user interface that enables user 20 to interact with message objects in mailboxes associated with user 20. Behaviors and interactions of these modules are described below with reference to FIG. 4.

Furthermore, as illustrated in the example of FIG. 3, client system 4 may comprise a local mailbox database 110. Mailbox database 110 stores local copies of mailboxes associated with user 20. In some example implementations, interface module 108 may use the local copies of mailboxes to enable user 20 to interact with message objects when client system 4 is offline.

The modules of client system 4 may cause client system 4 to perform particular behaviors in a variety of ways. For example, the modules may comprise software instructions that, when executed by a processing unit of client system 4, cause client system 4 to perform the behaviors. In a second example, the modules may comprise application specific integrated circuits (ASICs) that cause client system 4 to perform the behaviors. In a third example, the modules may comprise instructions and ASICs that jointly cause client system 4 to perform the behaviors.

Figure 4:
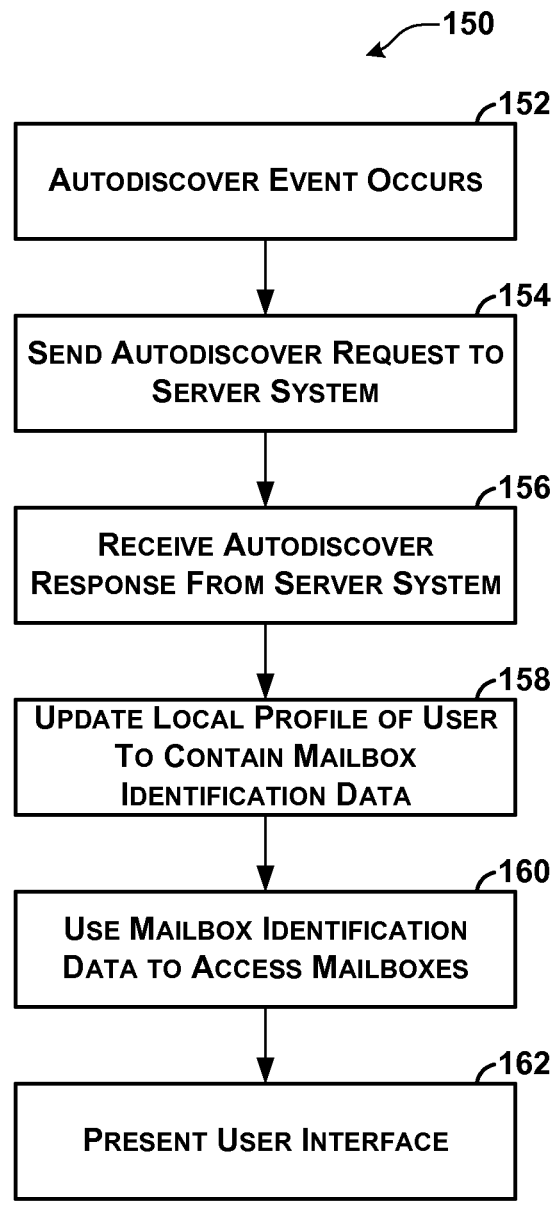
FIG. 4 is a flowchart illustrating an example operation performed by the client system.

FIG. 4 is a flowchart illustrating an example operation 150 of client system 4. Operation 150 begins when an autodiscover event occurs (152). An autodiscover event may occur at a variety of times. For example, an autodiscover event may occur when a messaging client application, such as the Microsoft OUTLOOK® messaging and collaboration client, is launched on client system 4. In this example, client system 4 may also send the autodiscover request when the messaging client application recovers from a failure, when the messaging client application is restarted, when local profile 104 of user 20 is created, when local profile 104 of user 20 is repaired, when an expiration of a time-to-live timer occurs, when a failure condition has occurred, and/or when other events occur.

After the autodiscover event occurs, autodiscover module 102 uses network interface module 100 to automatically send an autodiscover request to autodiscover server 14 in server system 6 (154). The autodiscover request may specify an email address associated with a primary mailbox of user 20 and/or may specify a legacy distinguished name of the primary mailbox of user 20. If autodiscover request specifies the email address associated with the primary mailbox of user 20, it may not be necessary for the autodiscover request to specify the legacy distinguished name of the primary mailbox of user 20, and vice versa. In one example implementation, the autodiscover request is formatted as an XML document. In this example implementation, the email address associated with the primary mailbox may be formatted as an <EmailAddress> element and the legacy distinguished name may be formatted as a <LegacyDN> element.

Next, autodiscover module 102 automatically uses network interface module 100 to receive an autodiscover response from autodiscover server 14 (156). The autodiscover response contains an autodiscover response document. The autodiscover response document contains a first set of mailbox identification data and at least one alternate mailbox element. The first set of mailbox identification data that identifies to server system 6 a primary mailbox of user 20. The first set of mailbox identification data may be formatted as one or more XML elements. The alternate mailbox element contains a second set of mailbox identification data that identifies to server system 6 an alternate mailbox of user 20.

After receiving the autodiscover response, autodiscover module 102 automatically updates local profile 104 to include the mailbox identification data specified by the autodiscover response document (158). In one example implementation, when autodiscover module 102 updates local profile 104, autodiscover module 102 determines whether local profile 104 contains any sets of mailbox identification data that are not included in the sets of mailbox identification data specified in the autodiscover response document. Local profile 104 may contain a set of mailbox identification data that is not included in the sets of mailbox identification data specified in the autodiscover response document when the set of mailbox identification data in local profile 104 identifies a mailbox that is no longer associated with user 20. When autodiscover module 102 determines that local profile 104 contains a set of mailbox identification data that is not included in the sets of mailbox identification data specified in the autodiscover response document, autodiscover module 102 removes the set of mailbox identification data from the local profile. Furthermore, when autodiscover module 102 updates local profile 104, autodiscover module 102 determines whether the autodiscover response document contains a set of mailbox identification data that is not included in local profile 104. When autodiscover module 102 determines that the autodiscover response document contains a set of mailbox identification data that is not included in local profile 104, autodiscover module 102 adds the set of mailbox identification data to local profile 104.

After autodiscover module 102 updates local profile 104, mailbox access module 106 automatically uses the sets of mailbox identification data in local profile 104 to access the mailboxes identified by the sets of mailbox identification data (160).

In the example implementation described above in which the autodiscover response document is an XML document, the autodiscover response document contains a <User> element that contains a <LegacyDN> element and possibly other elements. The autodiscover response document also contains a <Protocol> element that contains a <MdbDN> element, a <Server> element, a <ServerDN> element, and possibly other elements. In this example implementation, mailbox access module 106 may access the primary mailbox specified by the <LegacyDN> element that is within a mailbox database specified by the <MdbDN> element that is available through a mailbox server specified by the <Server> element that operating at a computing device specified by the <ServerDN> element.

Furthermore, in the example implementation described above in which the autodiscover response document is an XML document, the autodiscover response document contains an <AlternativeMailbox> element that contains at least a <LegacyDN> element, a <MdbDN> element, a <Server> element, a <ServerDN> element, and possibly other elements. In this example implementation, mailbox access module 106 may access an alternate mailbox specified by the <LegacyDN> element that is within a mailbox database specified by the <MdbDN> element that is available through a mailbox server specified by the <Server> element that is operating at a computing device specified by the <ServerDN> element.

Mailbox access module 106 may access the primary mailbox and the alternate mailboxes in a variety of ways. For example, mailbox access module 106 may include local mailbox database 110 that contains a copy of the primary mailbox and a copy of the alternate mailboxes. In this example, where the first and second sets of mailbox identification data specifies mailbox server 10, mailbox access module 106 may send remote procedure call messages to mailbox server 10 to synchronize copies of the primary mailbox and the alternate mailboxes stored at server system 6 with copies of the primary mailbox and the alternate mailboxes stored at local mailbox database 110. In response to the remote procedure call messages, mailbox server 10 sends to client system 4 data that synchronizes the copy of the primary mailbox stored at client system 4 with the copy of the primary mailbox stored at server system 6. In general, mailbox database 110 does not store copies of archive mailboxes. In another example, mailbox access module 106 may access the primary mailbox and the alternate mailboxes by sending requests for individual message objects.

After mailbox access module 106 accesses the primary mailbox and the alternate mailbox, user interface module 108 automatically presents a user interface that enables user 20 to interact with message objects in the primary mailbox and the one or more alternate mailboxes (162). In the example implementation described above in which the autodiscover response document is an XML document, the <User> element may also contain a <DisplayName> element and the <AlternativeMailbox> element may contain a <DisplayName> element. In this example implementation, the user interface may contain a list that contains labels of the primary mailbox and the one or more alternate mailboxes. In this example, user interface module 108 uses the name specified in the <Display Name> element within the <User> element as the label of the primary mailbox. User interface module 108 uses names specified in the <DisplayName> elements of the <AlternativeMailbox> elements as the labels of the alternate mailboxes.

Figure 5:
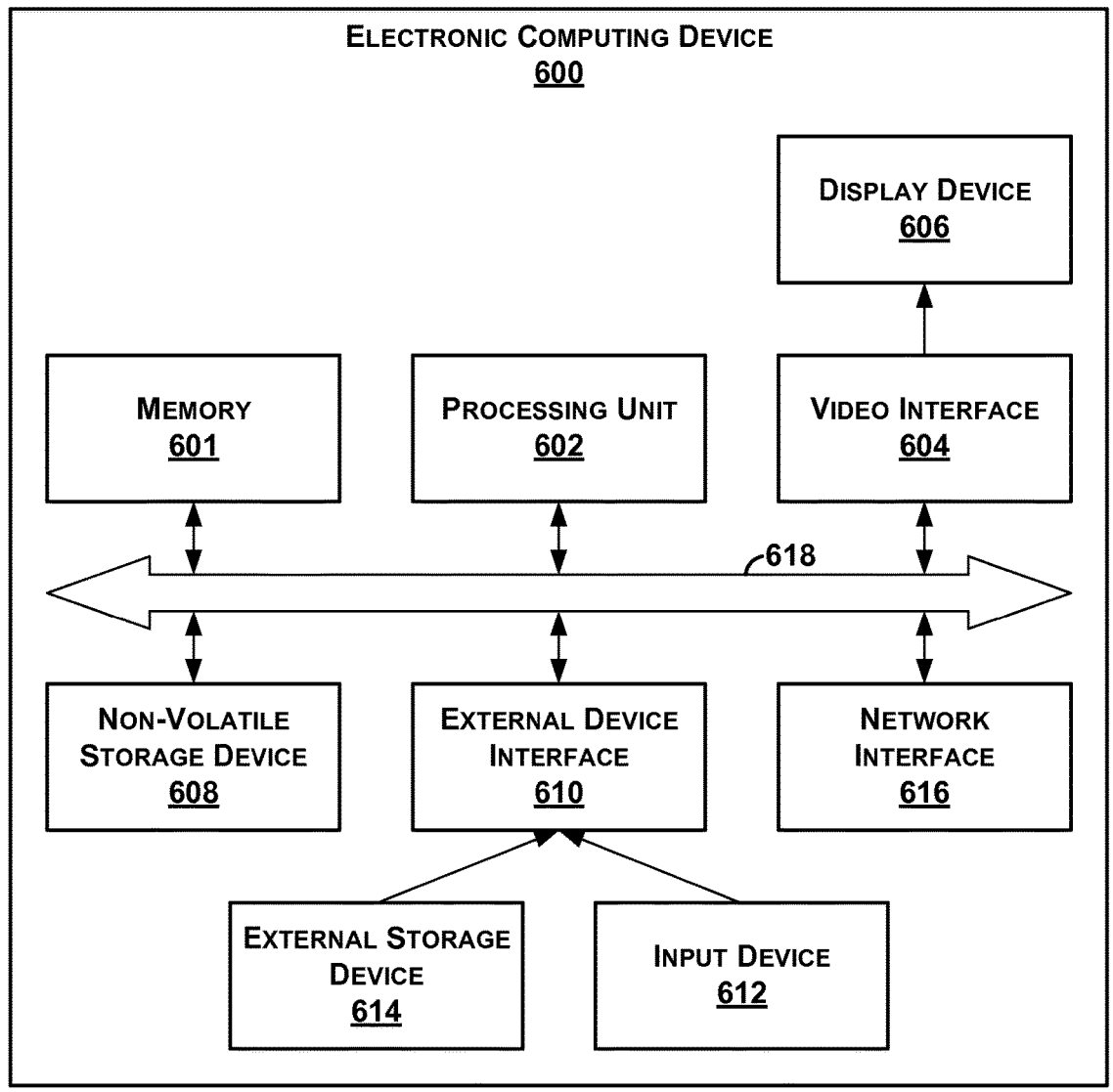
FIG. 5 is a block diagram illustrating example physical components of an electronic computing device.

FIG. 5 is a block diagram illustrating example physical components of an electronic computing device 600. Server system 6, client system 4, and/or electronic computing devices within server system 6 and/or client system 4 may be implemented in the manner of electronic computing device 600. As illustrated in the example of FIG. 5, server Electronic computing device 600 comprises a memory unit 601. Memory unit 601 is a computer-readable data storage medium that is capable of storing data and instructions. Memory unit 601 may be a variety of different types of computer-readable data storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable data storage media.

In addition, electronic computing device 600 comprises a processing unit 602. In a first example, processing unit 602 may execute software instructions that cause processing unit to provide specific functionality. In this first example, processing unit 602 may be implemented as one or more processing cores and/or as one or more separate microprocessors. For instance, in this first example, processing unit 602 may be implemented as one or more Intel Core 2 microprocessors. Processing unit 602 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 602 may be implemented as an application specific integrated circuit (ASIC) that provides specific functionality. In an third example, processing unit 602 may provide specific functionality by using an ASIC and by executing software instructions.

Electronic computing device 600 also comprises a video interface 604 that enables server system 6 to output video information to a display device 606. Display device 606 may be a variety of different types of display devices. For instance, display device 606 may be a cathode-ray tube display, an LCD display panel, a plasma screen display panel, a touch-sensitive display panel, a LED array, or another type of display device.

In addition, electronic computing device 600 includes a non-volatile storage device 608. Non-volatile storage device 608 is a computer-readable data storage medium that is capable of storing data and/or instructions. Non-volatile storage device 608 may be a variety of different types of different non-volatile storage devices. For example, non-volatile storage device 608 may be one or more hard disk drives, magnetic tape drives, CD-ROM drives, DVD-ROM drives, Blu-Ray disc drives, or other types of non-volatile storage devices.

Electronic computing device 600 also includes an external component interface 610 that enables server system 6 to communicate with external components. As illustrated in the example of FIG. 5, external component interface 610 communicates with an input device 612 and an external storage device 614. In one implementation of electronic computing device 600, external component interface 610 is a Universal Serial Bus (USB) interface. In other implementations of electronic computing device 600, electronic computing device 600 may include another type of interface that enables electronic computing device 600 to communicate with input device and/or output devices. For instance, electronic computing device 600 may include a PS/2 interface. Input device 612 may be a variety of different types of devices including, but not limited to keyboards, mice, trackballs, stylus input devices, touch pads, touch-sensitive display screens, or other types of input devices. External storage device 614 may be a variety of different types of computer-readable data storage media including magnetic tape, flash memory modules, magnetic disk drives, optical disc drives, and other computer-readable data storage media.

In addition, electronic computing device 600 includes a network interface 616 that enables electronic computing device 600 to send data to and receive data from network 8. Network interface 616 may be a variety of different types of network interface. For example, network interface 616 may be an Ethernet interface, a token-ring network interface, a fiber optic network interface, a wireless network interface (e.g., WiFi, WiMax, etc.), or another type of network interface.

Electronic computing device 600 also includes a communications medium 618 that facilitates communication among the various components of electronic computing device 600. Communications medium 618 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Several computer-readable data storage media are illustrated in the example of FIG. 5 (i.e., memory unit 601, non-volatile storage device 608, and external storage device 614). Together, these computer-readable data storage media may constitute a single logical computer-readable data storage medium. This single logical computer-readable data storage medium may store instructions executable by processing unit 602. Actions described in the above description may result from the execution of the instructions stored on this single logical computer-readable data storage medium. Thus, when this description says that a particular logical module performs a particular action, such a statement may be interpreted to mean that instructions of the software module cause a processing unit, such as processing unit 602, to perform the action.

The techniques of this disclosure may be realized in many ways. For example, the techniques of this disclosure may be realized as a method for configuring a client system to access a plurality of remotely-stored message mailboxes associated with a user. The method comprises automatically sending, from the client system to a server system via an electronic communications network, an autodiscover request that instructs the server system to provide to the client system an autodiscover response document conforming to a schema. In addition, the method comprises receiving, at the client system from the server system via the electronic communications network, an autodiscover response responsive to the autodiscover request, the autodiscover response containing the autodiscover response document. The autodiscover response document comprises a first set of mailbox identification data that identifies to the server system a primary mailbox associated with a user. In addition, the autodiscover response document comprises an alternate mailbox element that contains a second set of mailbox identification data that identifies to the server system an alternate mailbox associated with the user, the alternate mailbox being a peer of the primary mailbox. The method further comprises after receiving the autodiscover response, using, at the client system, the first set of mailbox identification data to access message objects in the primary mailbox. In addition, the method comprises after receiving the autodiscover response, using, at the client system, the second set of mailbox identification data to access message objects in the alternate mailbox.

In a second example, the techniques of this disclosure may be realized as an electronic computing system that comprises a processing unit, a network interface that enables the electronic computing device to communicate via an electronic communication network with a client system, and a computer-readable data storage system that stores instructions that, when executed by the processing unit, cause the processing unit to automatically receive, from the client system via the electronic communications network, an autodiscover request that instructs the electronic computing device to provide to the client system an autodiscover response document conforming to a schema. The instructions also cause the processing unit to send, to the client system from the electronic computing device via the electronic communications network, an autodiscover response responsive to the autodiscover request, the autodiscover response containing the autodiscover response document. The autodiscover response document comprises first set of mailbox identification data that identifies a primary mailbox associated with a user, thereby enabling the client system to access message objects in the primary mailbox. In addition, the autodiscover response document comprises an alternate mailbox element that contains a second set of mailbox identification data that identifies an alternate mailbox associated with the user, thereby enabling the client system to access message objects in the alternate mailbox, the alternate mailbox being a peer of the primary mailbox.

In a third example, the techniques of this disclosure may be realized as a computer-readable data storage medium comprising instructions that, when executed at an electronic computing system, cause the electronic computing system to automatically receive, from a client system via an electronic communications network, an autodiscover request that instructs the electronic computing device to provide to the client system an autodiscover response document conforming to a schema, the autodiscover request identifying a primary mailbox. The instructions also cause the processing unit to automatically retrieve, in response to receiving the autodiscover request, a remote profile of a user associated with the primary mailbox from a Lightweight Directory Access Protocol (LDAP) directory server that stores administrator-managed remote profiles of registered users of a messaging system. The instructions also cause the processing unit to automatically use the remote profile of the user associated with the primary mailbox to determine whether a user of the client system is allowed to access the primary mailbox. Furthermore, the instructions cause the processing unit to automatically send, when the user of the client system is not allowed to access the primary mailbox, an error response via the electronic communications network to the client system. The instructions also cause the processing unit to automatically generate, when the user of the client system is allowed to access the primary mailbox, a first set of mailbox identification data using the remote profile, the first set of mailbox identification data specifying a first extensible markup language (XML) element that specifies a first legacy distinguished name that identifies the primary mailbox, a second XML element that specifies a first mailbox database distinguished name that identifies a mailbox database that stores the primary mailbox, a third XML element that specifies a first mailbox server name that identifies a mailbox server that provides access to the mailbox database identified by the first mailbox distinguished name, and a fourth XML element that specifies a first server distinguished name that identifies a computing device at which the mailbox server identified by the first mailbox server name operates. In addition, the instructions cause the processing unit to automatically generate, when the user of the client system is allowed to access the primary mailbox, a second set of mailbox identification data using the remote profile of the user, the second set of mailbox identification data specifying a fifth XML element that specifies a second legacy distinguished name that identifies an archive mailbox, a sixth XML element that specifies a second mailbox database distinguished name that identifies a mailbox database that stores the archive mailbox, a seventh XML element that specifies a second mailbox server name that identifies a mailbox server that provides access to the mailbox database identified by the second mailbox database distinguished name, and an eighth XML element that specifies a second server distinguished name that identifies a computing device at which the mailbox server identified by the second mailbox server name operates. The instructions also cause the processing unit to automatically send, to the client system via the electronic communications network, an autodiscover response responsive to the autodiscover request, the autodiscover response containing an autodiscover response document that is formatted as an XML document, the autodiscover response document comprising the first XML element, the second XML element, the third XML element, the fourth XML element, the fifth XML element, the sixth XML element, the seventh XML element, and the eighth XML element. Furthermore, the instructions cause the processing unit to receive, from the client system after the autodiscover response is sent to the client system, a first request to access email message objects in the first mailbox. The instructions also cause the processing unit to receive, from the client system after the autodiscover response is sent to the client system, a second request to access email message objects in the archive mailbox.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for configuring a client system to access a plurality of remotely-stored message mailboxes associated with a user, the method comprising:

automatically sending, from the client system to a server system via an electronic communications network, an autodiscover request that instructs the server system to provide to the client system an autodiscover response document, the autodiscover response document conforming to a schema;

receiving, at the client system from the server system via the electronic communications network, an autodiscover response responsive to the autodiscover request, the autodiscover response containing the autodiscover response document, the autodiscover response document comprising:
- a first set of mailbox identification data that identifies to the server system a primary mailbox associated with a user, and
- an alternate mailbox element that contains a second set of mailbox identification data that identifies to the server system an alternate mailbox associated with the user, the alternate mailbox being a peer of the primary mailbox, wherein the alternate mailbox element comprises display name information for the alternate mailbox, and wherein the primary mailbox and the alternate mailboxes are different mailboxes;

after receiving the autodiscover response, using, at the client system, the first set of mailbox identification data to access message objects in the primary mailbox; and after receiving the autodiscover response, using, at the client system, the second set of mailbox identification data to access message objects in the alternate mailbox.

2. The method of claim 1, wherein the autodiscover response document is an extensible markup language (XML) document and the alternate mailbox element is an XML element.

3. The method of claim 1, wherein the alternate mailbox is an archive mailbox.

4. The method of claim 3, wherein using the second set of mailbox identification data to access message objects in the alternate mailbox comprises accessing, at the client system, individual ones of the message objects in the alternate mailbox without storing a copy of the alternate mailbox at the client system.

5. The method of claim 1, wherein using the first set of mailbox identification data to access message objects in the primary mailbox comprises:
- automatically sending, from the client system to the server system, a request to synchronize a copy of the primary mailbox stored at the client system with a copy of the primary mailbox stored at the server system; and
- receiving, at the client system from the server system in response to the request, data that synchronizes the copy of the primary mailbox stored at the client system with the copy of the primary mailbox stored at the server system.

6. The method of claim 1,
wherein the first set of mailbox identification data specifies a first legacy distinguished name that identifies the primary mailbox, a first mailbox database distinguished name that identifies a mailbox database that stores the primary mailbox, a first mailbox server name that identifies a mailbox server that provides access to the mailbox database identified by the first mailbox database distinguished name, and a first server distinguished name that identifies a computing device at which the mailbox server identified by the first mailbox server name operates; and wherein using the first set of mailbox identification data to access message objects in the primary mailbox comprises automatically accessing, at the client system, a mailbox identified by the first legacy distinguished name in a mailbox database identified by the first mailbox database distinguished name that is available through a mailbox server identified by the first mailbox server name that is operating at the computing device identified by the first server distinguished name.

7. The method of claim 1,
wherein the second set of mailbox identification data specifies a second legacy distinguished name that identifies the alternate mailbox, a second mailbox database distinguished name that identifies a mailbox database that stores the alternate mailbox, a second mailbox server name that identifies a mailbox server that provides access to the mailbox database identified by the second mailbox database distinguished name, and a second server distinguished name that identifies a computing device at which the mailbox server identified by the second mailbox server name operates; and wherein using the second set of mailbox identification data to access message objects in the alternate mailbox comprises automatically accessing, at the client system, the mailbox identified by the second legacy distinguished name in the mailbox database identified by the second mailbox database distinguished name that is available through the mailbox server identified by the second mailbox server name that is operating at the computing device identified by the second server distinguished name.

8. The method of claim 1, wherein automatically sending the autodiscover request comprises automatically sending the autodiscover request in response to an occurrence of an autodiscover event in a group of autodiscover events consisting of: an expiration of a time-to-live timer, creation of a local profile, repair of a local profile, a failure condition, and a restart of a messaging client application.

9. The method of claim 1, further comprising:
- after receiving the autodiscover response, automatically determining, at the client system, whether a local profile of the user specifies a third set of mailbox identification data that is not included in the autodiscover response document; and
- when the local profile of the user specifies the third set of mailbox identification data that is not included in the autodiscover response document, automatically removing, at the client system, the third set of mailbox identification data from the local profile of the user.

10. The method of claim 1, further comprising presenting, at the client system on a display device, a user interface that enables the user to interact with message objects in the primary mailbox and message objects in the alternate mailbox.

11. The method of claim 1, wherein the message objects in the primary mailbox are email message objects and the message objects in the alternate mailbox are email message objects.

12. An electronic computing device comprising:
a processing unit;
a network interface that enables the electronic computing device to communicate via an electronic communications network with a client system; and
a computer-readable data storage system that stores instructions that, when executed by the processing unit, cause the processing unit to:
- automatically receive, from the client system via the electronic communications network, an autodiscover request that instructs the electronic computing device to provide to the client system an autodiscover response document conforming to a schema; and automatically send, to the client system from the electronic computing device via the electronic communications network, an autodiscover response responsive to the autodiscover request, the autodiscover response containing the autodiscover response document, the autodiscover response document comprising:

a first set of mailbox identification data that identifies a primary mailbox associated with a user, thereby enabling the client system to access message objects in the primary mailbox, and an alternate mailbox element that contains a second set of mailbox identification data that identifies an alternate mailbox associated with the user, thereby enabling the client system to access message objects in the alternate mailbox, the alternate mailbox being a peer of the primary mailbox, wherein the alternate mailbox element comprises display name information and legacy distinguished name information for the alternate mailbox, and wherein the primary mailbox and the alternate mailboxes are different mailboxes.

13. The electronic computing device of claim 12, wherein the instructions further cause the processing unit to:

automatically retrieve, in response to receiving the autodiscover request, a remote profile of the user from a directory server; and automatically use the remote profile of the user to identify mailboxes associated with the user, thereby identifying the primary mailbox and the alternate mailbox.

14. The electronic computing device of claim 13, wherein the remote profile of the user is defined by input from an administrator without configuring the client system.

15. The electronic computing device of claim 13, wherein the instructions further cause the processing unit to:

generate the first set of mailbox identification data using the remote profile of the user; and generate the second set of mailbox identification data using the remote profile of the user.

16. The electronic computing device of claim 15, wherein the instructions cause the processing unit to generate the first set of mailbox identification data such that the first set of mailbox identification data specifies a first legacy distinguished name that identifies the primary mailbox, a first mailbox database distinguished name that identifies a mailbox database that stores the primary mailbox, a first mailbox server name that identifies a mailbox server that provides access to the mailbox database identified by the first mailbox database distinguished name, and a first server distinguished name that identifies a computing device at which the mailbox server identified by the first mailbox server name operates; and wherein the instructions cause the processing unit to generate the second set of mailbox identification data such that the second set of mailbox identification data specifies a second legacy distinguished name that identifies the alternate mailbox, a second mailbox database distinguished name that identifies a mailbox database that stores the alternate mailbox, a second mailbox server name that identifies a mailbox server that provides access to the mailbox database identified by the second mailbox database distinguished name, and a second server distinguished name that identifies a computing device at which the mailbox server identified by the second mailbox server name operates.

17. The electronic computing device of claim 16, wherein the instructions cause the processing unit to generate the second set of mailbox identification data such that the second legacy distinguished name is a first extensible markup language (XML) element, the second mailbox database distinguished name is a second XML element, the second mailbox server name is a third XML element, and the second server distinguished name is a fourth XML element.

18. The electronic computing device of claim 16, wherein the instructions cause the processing unit to generate the first set of mailbox identification data and the second set of mailbox identification data such that the first server distinguished name and the second server distinguished name identify different electronic computing devices within a server system.

19. The electronic computing device of claim 13, wherein the instructions further cause the processing unit to:

determine whether a user of the client system is allowed to access the primary mailbox;

send to the client system an error response when the user of the client system is not allowed to access the primary mailbox; and send the autodiscover response when the user of the client system is allowed to access the primary mailbox.

20. A storage device comprising instructions that, when executed by at least one processing unit of an electronic computing device, cause the processing unit to:

automatically receive, from a client system via an electronic communications network, an autodiscover request that instructs the electronic computing device to provide to the client system an autodiscover response document conforming to a schema, the autodiscover request identifying a primary mailbox;

automatically retrieve, in response to receiving the autodiscover request, a remote profile of a user associated with the primary mailbox from a Lightweight Directory Access Protocol (LDAP) directory server that stores administrator-managed remote profiles of registered users of a messaging system;

automatically use the remote profile of the user associated with the primary mailbox to determine whether a user of the client system is allowed to access the primary mailbox;

automatically send, when the user of the client system is not allowed to access the primary mailbox, an error response via the electronic communications network to the client system;

automatically generate, when the user of the client system is allowed to access the primary mailbox, a first set of mailbox identification data using the remote profile, the first set of mailbox identification data specifying a first extensible markup language (XML) element that specifies a first legacy distinguished name that identifies the primary mailbox, a second XML element that specifies a first mailbox database distinguished name that identifies a mailbox database that stores the primary mailbox, a third XML element that specifies a first mailbox server name that identifies a mailbox server that provides access to the mailbox database identified by the first mailbox database distinguished name, and a fourth XML element that specifies a first server distinguished name that identifies a computing device at which the mailbox server identified by the first mailbox server name operates;

automatically generate, when the user of the client system is allowed to access the primary mailbox, a second set of mailbox identification data using the remote profile of the user, the second set of mailbox identification data specifying a fifth XML element that specifies a second legacy distinguished name that identifies an archive mailbox, wherein the primary mailbox and the archive mailbox are different mailboxes, a sixth XML element that specifies a second mailbox database distinguished name that identifies a mailbox database that stores the archive mailbox, a seventh XML element that specifies a second mailbox server name that identifies a mailbox server that provides access to the mailbox database identified by the second mailbox database distinguished name, and an eighth XML element that specifies a second server distinguished name that identifies a computing device at which the mailbox server identified by the second mailbox server name operates;

automatically send, to the client system via the electronic communications network, an autodiscover response responsive to the autodiscover request, the autodiscover response containing an autodiscover response document that is formatted as an XML document, the autodiscover response document comprising the first XML element, the second XML element, the third XML element, the fourth XML element, the fifth XML element, the sixth XML element, the seventh XML element, and the eighth XML element;

receive, from the client system after the autodiscover response is sent to the client system, a first request to access email message objects in the primary mailbox; and receive, from the client system after the autodiscover response is sent to the client system, a second request to access email message objects in the archive mailbox.

* * * * *